United States Patent
Saito et al.

(10) Patent No.: US 10,290,913 B2
(45) Date of Patent: May 14, 2019

(54) DEPLOYMENT STRUCTURE COMPRISED OF FLAT PANELS WITH WAVEGUIDES DISPOSED THEREIN, WHERE THE FLAT PANELS ARE ROTATED INTO ENGAGEMENT WITH EACH OTHER TO COUPLE THE WAVEGUIDES

(71) Applicant: Japan Aerospace Exploration Agency, Tokyo (JP)

(72) Inventors: Hirobumi Saito, Tokyo (JP); Atsushi Tomiki, Sagamihara (JP)

(73) Assignee: JAPAN AEROSPACE EXPLORATION AGENCY, Tokyo (JP)

( * ) Notice: Subject to any disclaimer, the term of this patent is extended or adjusted under 35 U.S.C. 154(b) by 41 days.

(21) Appl. No.: 14/900,048

(22) PCT Filed: Jun. 19, 2014

(86) PCT No.: PCT/JP2014/066237
§ 371 (c)(1),
(2) Date: Apr. 5, 2016

(87) PCT Pub. No.: WO2014/203952
PCT Pub. Date: Dec. 24, 2014

(65) Prior Publication Data
US 2016/0218408 A1    Jul. 28, 2016

(30) Foreign Application Priority Data
Jun. 19, 2013    (JP) .................................. 2013-128851

(51) Int. Cl.
*H01P 1/06*    (2006.01)
*H01P 1/04*    (2006.01)
(Continued)

(52) U.S. Cl.
CPC .............. *H01P 1/064* (2013.01); *B64G 1/222* (2013.01); *H01P 1/042* (2013.01); *H01P 3/127* (2013.01);
(Continued)

(58) Field of Classification Search
CPC ................................ H01P 1/064; H01P 1/042
(Continued)

(56) References Cited

U.S. PATENT DOCUMENTS 2,463,347 A * 3/1949 Aron et al. ............. H01P 1/064
333/256
2,476,621 A * 7/1949 Okress .................... H01P 1/042
285/148.22
(Continued)

FOREIGN PATENT DOCUMENTS

DE    102010014864 A1    10/2011
EP    0478894 A1    4/1992
(Continued)

OTHER PUBLICATIONS

Extended European Search Report dated Feb. 15, 2017, which issued in European Application No. 14813047.9.
(Continued)

*Primary Examiner* — Benny T Lee
(74) *Attorney, Agent, or Firm* — McDermott Will & Emery LLP (57) ABSTRACT

Provided is a high-frequency wave feeding system capable of feeding microwaves with little loss and without addition of resistive noise, using a simple deployment mechanism. The system includes a first waveguide fixed to a first structure of a deployment structure and having a choke flange, and a second waveguide fixed to a second structure of the deployment structure and having a cover flange. When the deployment structure is in a deployed state, the choke
(Continued)

1a and 1b : first and second flat panels
2: spiral spring
5a and 5b: hinge plates
6 : choke flange (integral with 5a)
7 : cover flange (integral with 5b)

flange and the cover flange face each other so that high-frequency waves are fed to the deployment structure via the first and second waveguides.

10 Claims, 9 Drawing Sheets

(51) Int. Cl.
    *H01P 5/02*     (2006.01)
    *H01Q 1/08*     (2006.01)
    *H01Q 1/28*     (2006.01)
    *B64G 1/22*     (2006.01)
    *H01P 3/127*     (2006.01)

(52) U.S. Cl.
    CPC ............. *H01P 5/024* (2013.01); *H01Q 1/08* (2013.01); *H01Q 1/288* (2013.01)

(58) Field of Classification Search
    USPC ........................................ 333/256, 257, 254
    See application file for complete search history.

(56) References Cited

U.S. PATENT DOCUMENTS

| | | | |
|---|---|---|---|
| 2,632,807 A * | 3/1953 | Kirkpatrick et al. | H01P 1/064 333/256 |
| 3,155,923 A * | 11/1964 | Persson | H01P 1/042 333/106 |
| 4,625,188 A * | 11/1986 | Bourgie | H01P 1/042 333/257 |
| 4,879,534 A * | 11/1989 | Spinner | H01P 1/06 333/254 |
| 5,245,301 A | 9/1993 | Portrait et al. | |
| 2011/0156844 A1 | 6/2011 | Wakabayashi et al. | |

FOREIGN PATENT DOCUMENTS

| | | |
|---|---|---|
| JP | 57-46501 A | 3/1982 |
| JP | H06296108 A | 10/1994 |
| JP | 2005-340964 A | 12/2005 |
| JP | 2005340963 A | 12/2005 |
| JP | 2007-336299 A | 12/2007 |
| JP | 2009171488 A | 7/2009 |

OTHER PUBLICATIONS

Mori, et al., "Our Microwave Rotary Joint," SPC Technical Report, No. 18, 2006, pp. 35-43, together with English language translation thereof.

Japanese Office Action issued in corresponding Japanese Patent Application No. 2015-522968, dated Nov. 12, 2018, with English Translation.

* cited by examiner

FIG. 1

PRIOR ART 1a and 1b : first and second flat panels
2 : spiral spring
3a and 3b : hinge plates
4 : flexible waveguide

FIG. 2

PRIOR ART 1a and 1b : first and second flat panels
2 : spiral spring
5a and 5b : hinge plates
A : concave portion
    for fitting together
B : convex portion
    for fitting together

FIG. 3

PRIOR ART

FIG. 4

PRIOR ART

PRIOR ART

1a and 1b : first and second flat panels
2: spiral spring
5a and 5b: hinge plates 6 : choke flange (integral with 5a)
7 : cover flange (integral with 5b)

FIG. 11

1a and 1b : first and second flat panels
2: spiral spring
5a and 5b: hinge plates 6 : choke flange (separate from 5a)
7 : cover flange (separate from 5b)

DEPLOYMENT STRUCTURE COMPRISED OF FLAT PANELS WITH WAVEGUIDES DISPOSED THEREIN, WHERE THE FLAT PANELS ARE ROTATED INTO ENGAGEMENT WITH EACH OTHER TO COUPLE THE WAVEGUIDES

TECHNICAL FIELD

The present invention relates to a system for feeding high-frequency waves to a deployment structure.

BACKGROUND ART

An antenna or the like mounted on an artificial satellite may need to feed high-frequency waves to a deployment structure because of system configuration.

Figure 1:
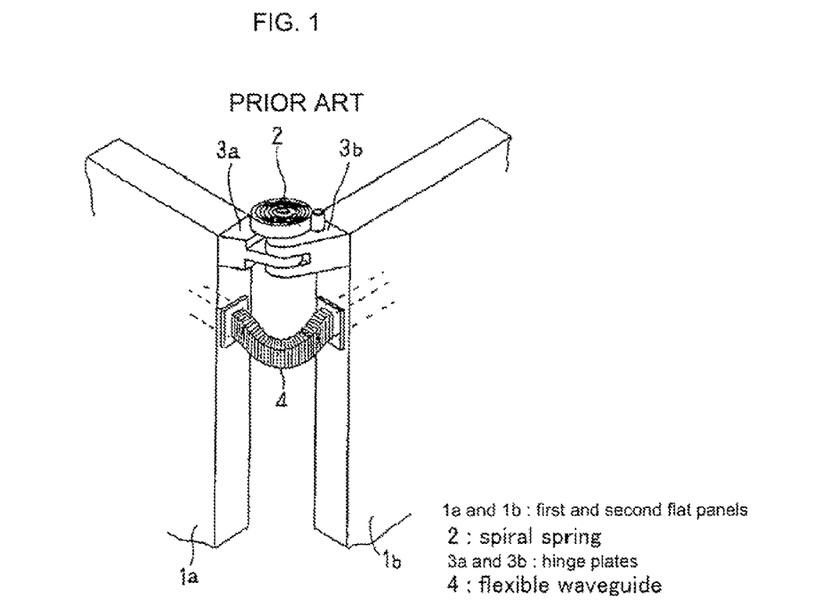
FIG. 1 is a view illustrating a conventional example in which a flexible waveguide is used in a deployment portion, as disclosed in Patent Literature 1.

Flexible guided lines such as cables and flexible waveguides have been used as conventional methods. FIG. 1 shows an example in a Patent Literature 1 where a flexible waveguide 4 is used at a deployment part in a deployment structure consisting of a first flat panel 1a and a second flat panel 1b with a spiral spring 2 and a 2-piece hinge 3a and 3b. In general, however, flexible waveguides 4 have larger RF loss than rigid waveguides as the frequency increases, which results in degradation of their RF characteristics. RF losses of flexible waveguides are resistive and may lead to increase in the system noise temperature in a receiver system due to resistive loss. Flexible waveguides have still resistive torque for bending that cannot be ignored and the resistive torque tends to increase at low temperature with some degree of uncertainty. Therefore in some cases flexible waveguides may cause troubles in design and test of deployment mechanism.

Figure 2:
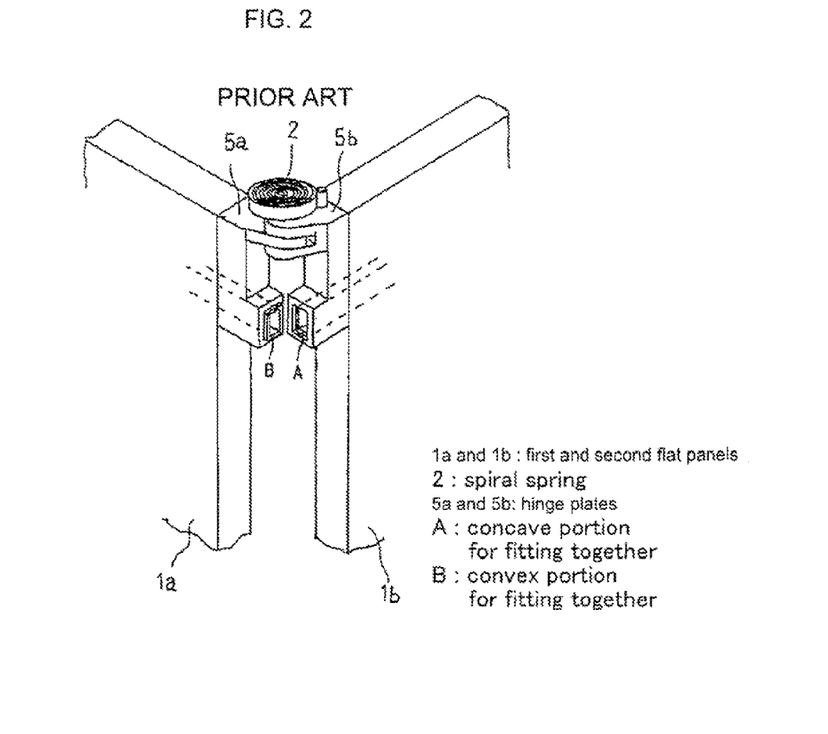
FIG. 2 is a view illustrating a conventional example in which concave and convex portions in a waveguide connection portion are fitted together, as disclosed in Patent Literature 1.
Figure 3:
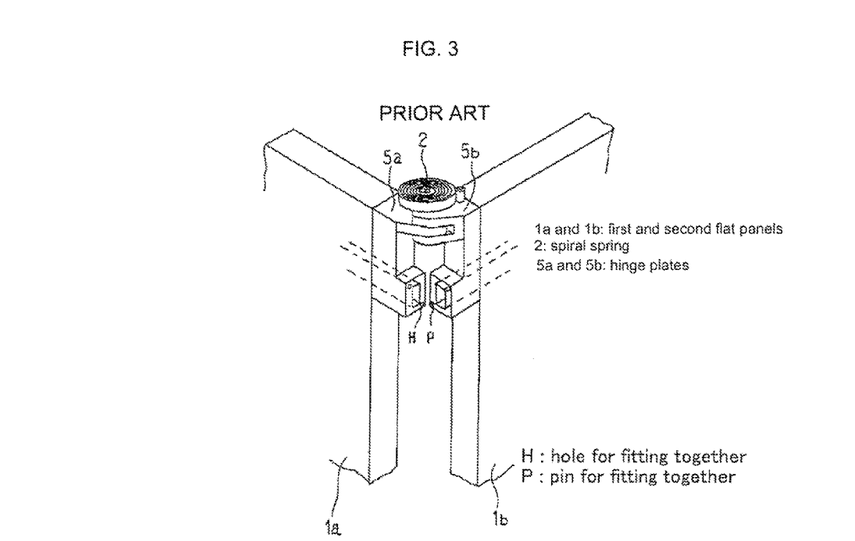
FIG. 3 is a view illustrating a conventional example in which pins and holes in a waveguide connection portion are fitted together, as disclosed in Patent Literature 1.

In contrast, there have been proposed methods in which the flexible waveguide is not used in the deployment portion in a deployment structure consisting of a first flat panel 1a, a second flat panel 1b, a spiral spring 2 and a 2-piece hinge 5a and 5b as shown in FIGS. 2 and 3. A first method proposes a system in which a rigid waveguide alone is utilized and, for a waveguide opening in the deployment portion, a mechanism utilizing a hinge is used to fit together convex portion A and concave portion B (as shown in FIG. 2) or pin portion P and hole portion H (as shown in FIG. 3) provided in the vicinity of two waveguide openings. This is disclosed in Patent Literature 1. Conceptual illustrations are also shown in FIGS. 2 and 3 of Patent Literature 1. However, the first method has a problem with machine accuracy for fitting or the amount of torque. Insufficient fitting force may cause a high-frequency loss and additional noise due to an increase in contact resistance between conductors. Thus, an example of practice of the system has not been known.

Figure 4:
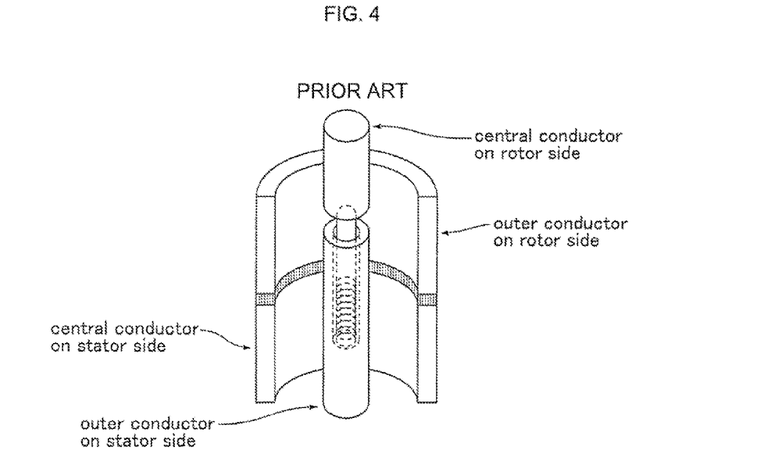
FIG. 4 is a view illustrating a conventional example of a rotary joint using a coaxial cable, as disclosed in Non-Patent Literature 1.
Figure 5:
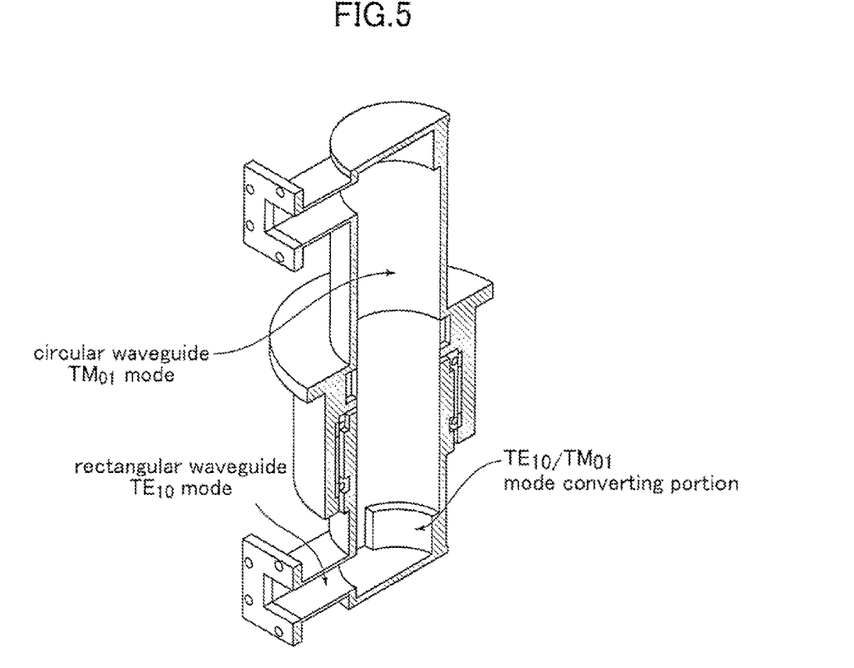
FIG. 5 is a view illustrating a conventional example of a rotary joint using a circular waveguide, as disclosed in Non-Patent Literature 1.

A second method utilizes a rotary joint in which waveguides fixed to two structures, respectively, which rotate about a certain shaft, are high-frequency coupled together, utilizing axisymmetric properties about the rotating shaft. FIG. 4 illustrates an example of a rotary joint using a coaxial cable, and FIG. 5 illustrates an example of a rotary joint using a circular waveguide (Non-Patent Literature 1). The rotary joint of FIG. 4 includes a central conductor on rotor side, an outer conductor on rotor side, a central conductor on stator side, and an outer conductor on stator side as shown in FIG. 4. The rotary joint of FIG. 5 includes a circular waveguide $TM_{01}$ mode, a rectangular waveguide $TE_{10}$ mode, and a $TA_{10}/TM_{01}$ mode converting portion as shown in FIG. 5. In this method, the transmitting $TE_{10}$ mode of rectangular waveguides is converted to a $TM_{01}$ mode of circular waveguides or a TEM mode of coaxial lines and RF loss occurs at the mode conversion. Moreover, a hinge shaft which serves as a deployment mechanism for a load or accuracy of position is coaxial with the rotating shaft of the rotary joint which serves for electrical characteristics, which in turn increases complexity of the mechanism. A direction of high-frequency wave feeding is often orthogonal to a deployment shaft; however, a system using the rotary joint requires that a high-frequency waveguide make two right-angle turns, which thus increases the size of the mechanism.

PRIOR ART DOCUMENTS

Patent Literature

Patent Literature 1: Japanese Patent Application Publication No. 6-296108

Non-Patent Literature

Non-Patent Literature 1: SPC Technical Report, No. 18, Pages 35-43, 2006

SUMMARY OF THE INVENTION

Problems to be Solved by the Invention

As mentioned above, for an antenna or the like mounted on an artificial satellite, there has not yet been proposed a system for feeding high-frequency waves of microwaves or millimeter waves to a deployment structure, which is simple and avoids deterioration in high-frequency characteristics of equipment.

An object of the present invention is to provide a high-frequency wave feeding system capable of feeding microwaves to a deployment structure in an antenna or the like mounted on an artificial satellite, with little loss and without addition of resistance noise, using a simple deployment mechanism, without use of a flexible feeder which produces resistance torque during deployment.

Means for Solving the Problems

In order to solve the foregoing problems, a first invention of the present application provides a system for feeding high-frequency waves from one to another of plural components which form a deployment structure, via plural waveguides, the system including: a first waveguide fixed to a first component of the deployment structure and having a choke flange; and a second waveguide fixed to a second component of the deployment structure and having a cover flange, wherein when the deployment structure is in a deployed state, the choke flange and the cover flange face each other so that the high-frequency waves are fed via the first and second waveguides from one to another of the plural components of the deployment structure.

In order to solve the foregoing problems, a second invention of the present application provides the system of the first invention, wherein the first waveguide is fixed directly to the first component, and the second waveguide is fixed directly to the second component.

It should be noted that the deployment structure of the first and second invention, may be include a deployable antenna.

In order to solve the foregoing problems, a third invention of the present application provides the system of the first invention, wherein the first component and the second component are connected to movable portions, respectively, of a hinge and are configured to be deployable by operation of the hinge, and the first waveguide and the second waveguide are integrally constructed with the movable portions, respectively, of the hinge.

Although a choke groove of the choke flange may be circular in shape, the shape may be formed of a non-circular curved line, thereby achieving a more effective reduction in a loss of a high-frequency signal.

BRIEF DESCRIPTION OF THE DRAWINGS

FIG. 7 is a view illustrating an arrangement of two waveguides provided with a choke flange and a cover flange with a gap in between.

DETAIL DESCRIPTION OF EMBODIMENTS

1. Choke Flange

Figure 6:
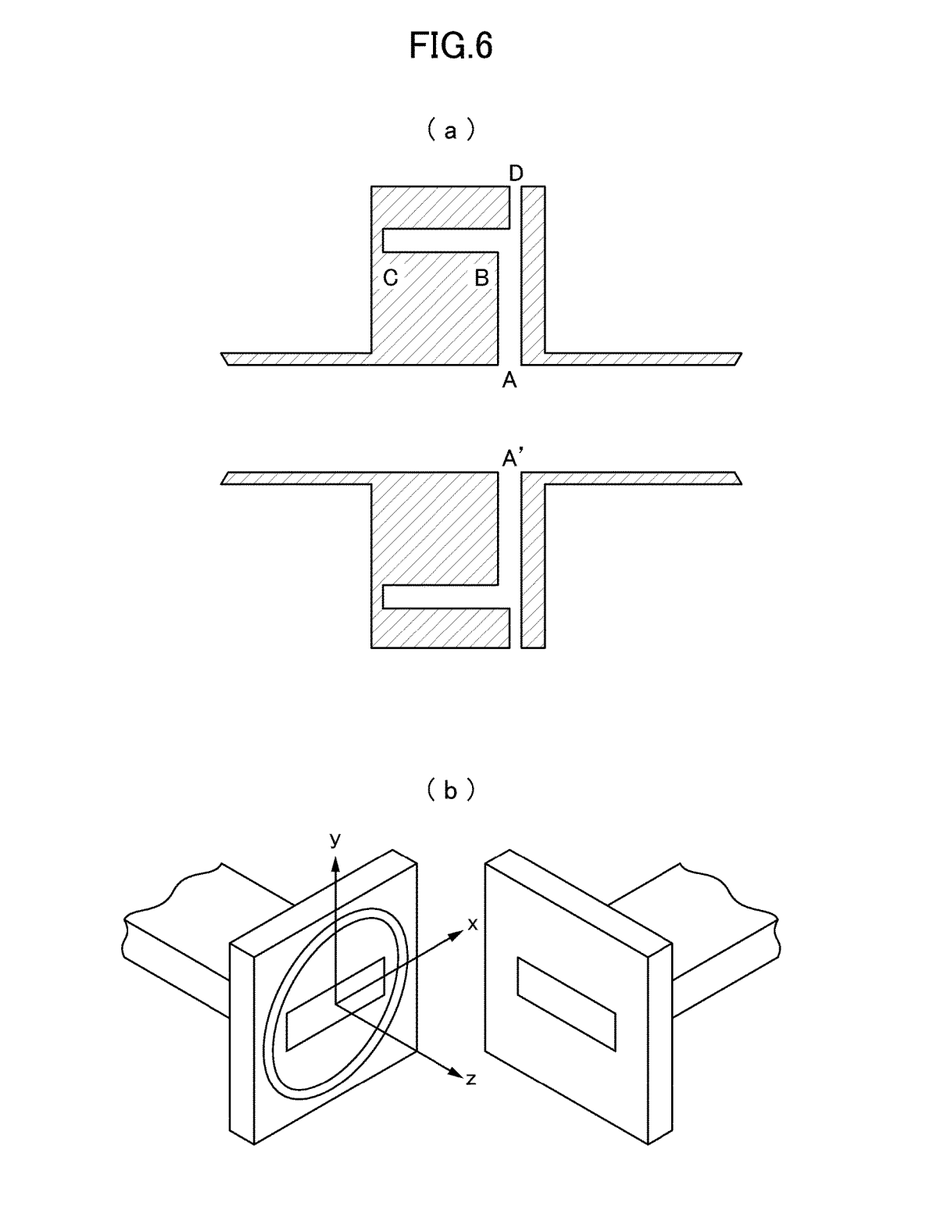
FIG. 6 is a view illustrating a choke flange and a cover flange, and FIG. 6($a$) is a cross-sectional view at a center along a long side, and FIG. 6($b$) is a view illustrating a perspective view and a coordinate system therein.

Description will be given by use of FIG. 6 with regard to a structure widely known as a choke flange. FIG. 6($a$) illustrates a cross-sectional view of a rectangular waveguide at a central point along a long side thereof, and FIG. 6($b$) illustrates a perspective view and a coordinate system. Here, FIG. 6($a$) is a cross-sectional view taken along a y-z plane of FIG. 6($b$). In FIG. 6($a$), waveguides for feeding, extending from the left- and right-hand sides, respectively, are arranged facing each other with a gap in between at a point AA'. Meanwhile, a flange of the waveguide on the left-hand side of FIG. 6($a$) is provided with a groove, and a flange of the other waveguide on the right-hand side is flat. This flat waveguide flange is called a cover flange.

The gap between the two waveguides can be regarded as a transmission line, and in its transmission mode, a wavelength is set to $\lambda$. When the waveguide for feeding is used in $TE_{01}$ mode of a fundamental wave, $\lambda$ is substantially equal to a tube wavelength of the waveguide for feeding. As illustrated in FIG. 6($a$), at a point B spaced about $\lambda/4$ away from the point A, the left-hand waveguide is provided with the groove having a depth (BC) of about $\lambda/4$. The groove BC can also be regarded as a similar transmission line. In such a structure, a transmission line BC is connected at the point B in series with a transmission line ABD formed by the gap.

The transmission line BC is short-circuited at a point C by a conductor and has extremely low impedance. At the point B spaced $\lambda/4$ away, the impedance is converted through the transmission line into extremely high impedance. For a gap BD, due to its shape or surrounding object, it is difficult to determine what extent of impedance is possessed by the gap BD; however, due to the extremely high series impedance BC, the impedance at the point B on the combined transmission line has an extremely high value. As seen at the point A in a plane of the waveguide for feeding, this impedance is converted into extremely low impedance by characteristics of the transmission line of $\lambda/4$. Thus, at the point A, a high-frequency current flowing in the waveguide plane (or a barrier current in the waveguide plane) smoothly flows in the form of a displacement current in spite of the presence of the gap, so that the waveguide for feeding is maintained in the transmission mode without disturbance.

In the choke flange provided with the groove in the periphery of the waveguide as described above, the transmission lines extending in depth and radial directions, respectively, of the groove can lessen the short-circuiting effect of the conductor at the bottom of the groove thereby to change impedance in a portion even in the presence of the physical gap into equivalently low impedance, thus enabling an effective reduction in a high-frequency leakage or loss through the gap. Moreover, even the occurrence of a loss is caused by a leakage of a high-frequency electromagnetic field, thus involving no addition of resistance noise.

In MIL-STD or other standard choke flanges, a choke operation effectively functions throughout the recommended range of frequencies (typically, at frequencies which are 1.3 to 1.9 times a cut-off frequency).

2. Measurement of Feeding Loss in Two Waveguides Facing Each Other with Gap in Between Description will be given with regard to effects of a choke flange with a gap between openings of two waveguides. Description will be given below by way of example with regard to a case where a frequency in an X band (e.g., 9.6 GHz) is used. Note that a relative ratio between a wavelength used and a gap can be used for generalization to the use of other frequencies.

Figure 7:
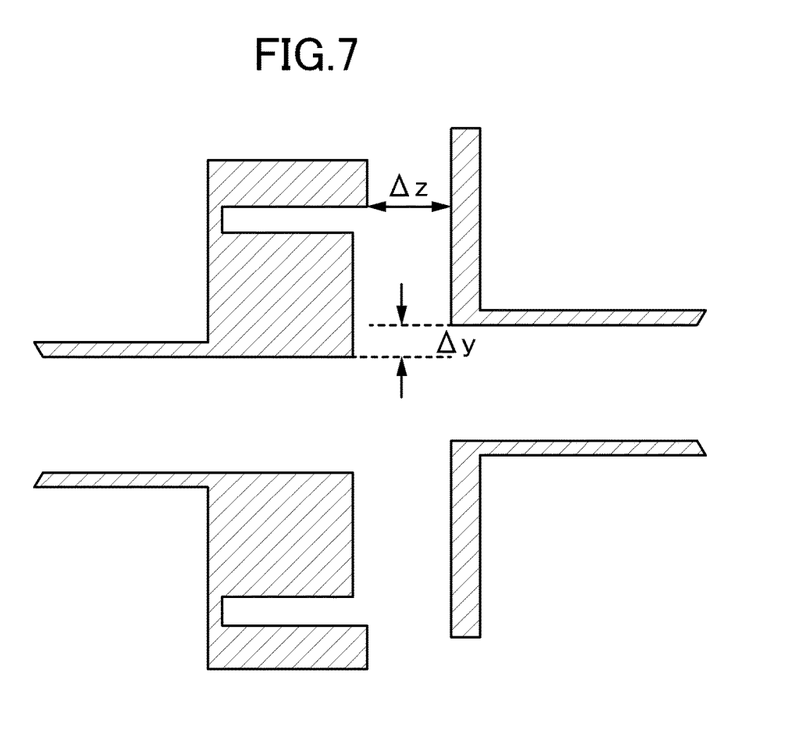

A WR-90/R100 rectangular waveguide (having an opening with dimensions of 22.86×10.16 mm) provided with a standard rectangular flange (SQUARE FLANGE CHOKE, CBR100) with a choke groove, and a waveguide based on the same standard, provided with a flat rectangular flange (SQUARE FLANGE PLAIN, UBR100) were used. A long side direction of the rectangular waveguide is defined as an x axis, a short side direction thereof is defined as a y axis, and a propagation direction of the waveguide is defined as a z axis (refer to FIG. 6(b)). The two waveguides, with their end faces parallel to each other, are arranged with a gap in between, in positions offset by Δx in the x-axis direction (not shown), by Δy in the y-axis direction, and by Δz in the z-axis direction, respectively, as shown in FIG. 7, from a normal position of connection at which the waveguides are in intimate contact with each other. Such an arrangement of the two waveguides with the gap in between is illustrated in FIG. 7.

A vector network analyzer was used to measure propagation losses (S12 and S21) at 9.60 GHz in the two waveguides with the gap in between. The amount of increase with respect to a propagation loss under a condition where the two waveguides are in intimate contact with each other at the normal position (where Δx=Δy=Δz=0) is defined as "loss in the presence of the gap."

Figure 8:
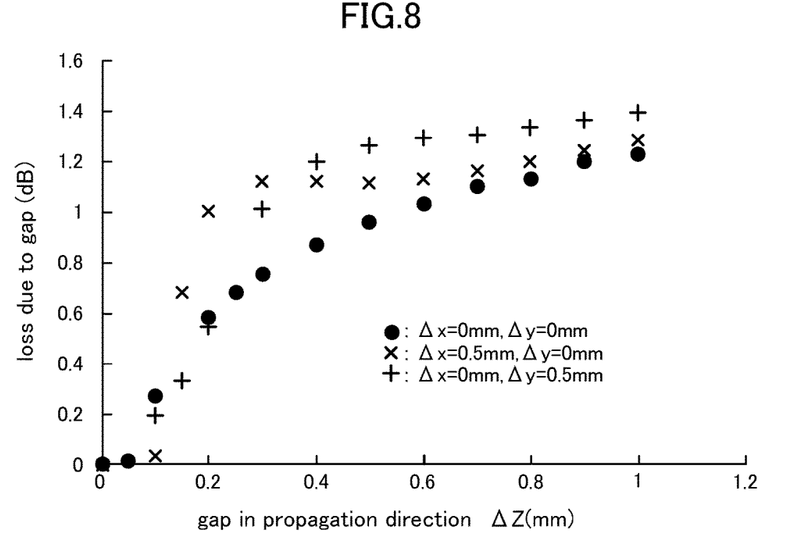
FIG. 8 is a graph illustrating results of an experiment on loss due to the gap in a case where the two waveguides are both provided with cover flanges.

Firstly, results in a case where the two waveguides are both provided with cover flanges, as a basic configuration, are shown. A center position (where Δx=Δy=0 mm, shown by ●), a position offset by 0.5 mm in the direction along the long side (where Δx=0.5 mm, Δy=0 mm, shown by x), and a position offset by 0.5 mm in the direction along the short side (where Δx=0 mm, Δy=0.5 mm, shown by +) are set as the relative positions of the two waveguides in a cross-sectional direction, and in cases of these positions, "loss due to the gap", measured in dB, is illustrated in FIG. 8 as a function of the gap in the propagation direction Δz, measured in mm, in the z-axis direction. It can be seen that a loss of about 0.3 dB occurs even when the gap Δz is as minute as 0.1 mm, and a loss of about 1 dB occurs when Δz is 0.5 mm.

Figure 9:
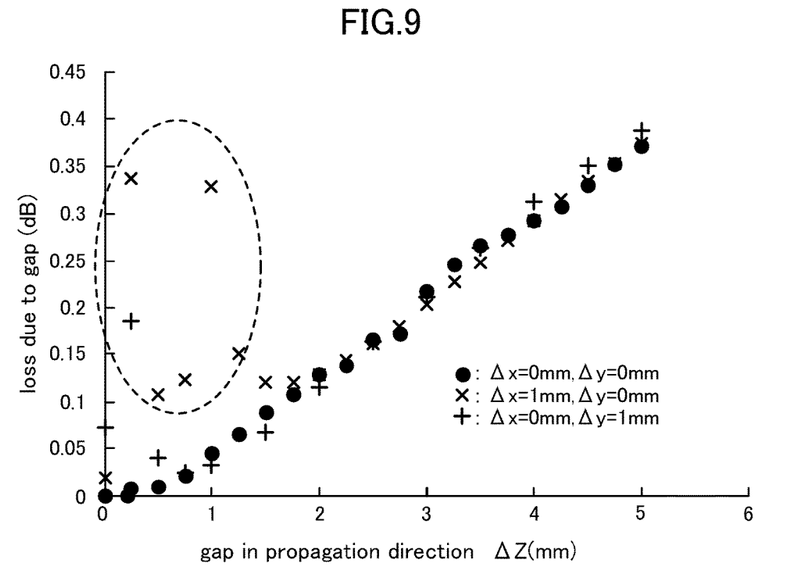
FIG. 9 is a graph illustrating results of an experiment on loss due to the gap in a case where one of the waveguides is provided with a choke flange and the other waveguide is provided with a cover flange.

Next, results in a case where one of the waveguides is provided with a choke flange and the other waveguide is provided with a cover flange are shown. The center position (where Δx=Δy=0 mm, shown by ●), a position offset by 1 mm in the direction along the long side (where Δx=1 mm, Δy=0 mm, shown by x), and a position offset by 1 mm in the direction along the short side (where Δx=0 mm, Δy=1 mm, shown by +) are set as the relative positions of the two waveguides in the cross-sectional direction, and in cases of these positions, "loss due to the gap", measured in dB, is illustrated in FIG. 9 as a function of the gap Δz, measured in mm, in the z-axis direction. Note that although the horizontal axes are gap in propagation direction Δz, and the vertical axes are loss due to gap measured in dB in both FIGS. 8 and 9, a scale of a horizontal axis in FIG. 9 is different from that in FIG. 8. Losses were measured as given below: in a case where the two waveguides are located at the center position (where Δx=Δy=0 mm), a loss of 0.01 dB (0.2%) occurs when the gap Δz is equal to 0.5 mm, a loss of 0.05 dB (1%) occurs when the gap Δz is equal to 1.0 mm, and a loss of 0.13 dB (3%) occurs when the gap Δz is equal to 2 mm. These results show that the losses are significantly reduced as compared to a case where the choke flange is not used (FIG. 8).

Even if the choke flange is used, the two waveguides do not completely directly face each other in the cross-sectional direction but may actually be "offset" from each other, and thus, description will be given with regard to characteristics in such a situation. In a region where the gap in the z direction is greater than 1 mm (Δz>1 mm), a loss substantially equal to that when the waveguides directly face each other is exhibited. However, in a region where the gap in the z direction is smaller than 1 mm (Δz<1 mm), an increase in loss was observed in the form of a resonance phenomenon depending on a frequency and a three-dimensional gap between the two waveguides (enclosed by a dashed region). Under this condition, it is observed that there is an increase in intensity of an electromagnetic wave leaking through the gap between the flanges, which in turn suggests that a function of the choke flange has deteriorated resonantly. Although this experiment used the standard choke flange (SQUARE FLANGE CHOKE, CBR100), it can be inferred that there may be room for a structural device capable of reducing the occurrence of such a resonant phenomenon.

3. Feeding to Deployable Antenna by Waveguides Facing Each Other

The present invention adopts a feeding system using a rigid waveguide, which is a most compact and low-loss feeding system for use in a region of microwaves or millimeter waves. As for feeding to a deployment portion, adoption of a system which makes a changeover to a flexible waveguide or cable is avoided because of a marked high-frequency loss, resistance torque during deployment, and complexity of electrical instrumentation.

Instead, for the deployment portion, a system is proposed in which the end faces of the two waveguides are provided with the choke flange and the cover flange and the flanges are arranged facing each other.

Use of the choke flange allows a significant reduction in a loss due to the gap between the waveguides in their cross section, which occurs in this case. In the X band (9.6 GHz), losses are suppressed as given below: in a case where the two waveguides are located at the center position in the cross-sectional direction (where Δx=Δy=0 mm), a loss of 0.01 dB (0.2%) occurs when the gap Δz in the z direction is equal to 0.5 mm (λ/60), a loss of 0.05 dB (1%) occurs when the gap Δz is equal to 1.0 mm (λ/30), and a loss of 0.13 dB (3%) occurs when the gap Δz is equal to 2 mm (λ/15).

However, when the two waveguides do not completely directly face each other but are offset in their cross section from each other by the order of 0.3 mm (λ/100) or more, the operation of the choke flange deteriorates and thus increases the loss due to the gap. However, in a region where the gap in the z direction is greater than 2 mm (λ/15), the effect of this phenomenon becomes so lessened that it is negligible. In the region where the gap in the z direction is greater than 2 mm (λ/15), the effect of the phenomenon becomes gradually negligible, while on the other hand, the loss increases due to the gap in the z direction.

In accordance with characteristics of the choke flange as described above, the following two cases are proposed as approaches for solving the problems.

Case of Deployment Mechanism with Rough Accuracy:

The two waveguides are arranged facing each other with an accuracy of λ/30 (or the order of 1 mm in the X band) in the cross-sectional direction (x, y), and with a gap of λ/15 (or the order of 2 mm in the X band) kept in the propagation direction z. Thereby, the loss due to the gap can be of the order of 0.13 dB (about 3%).

Case of Deployment Mechanism with High Accuracy:

The two waveguides are arranged facing each other with an accuracy of λ/100 (or the order of 0.3 mm in the X band) in the cross-sectional direction (x, y), and with a gap of λ/60 (or the order of 0.5 mm in the X band) or less kept in the propagation direction z. Thereby, the loss due to the gap can be reduced to 0.01 dB (about 0.2%) or less in the X band.

Figure 10:
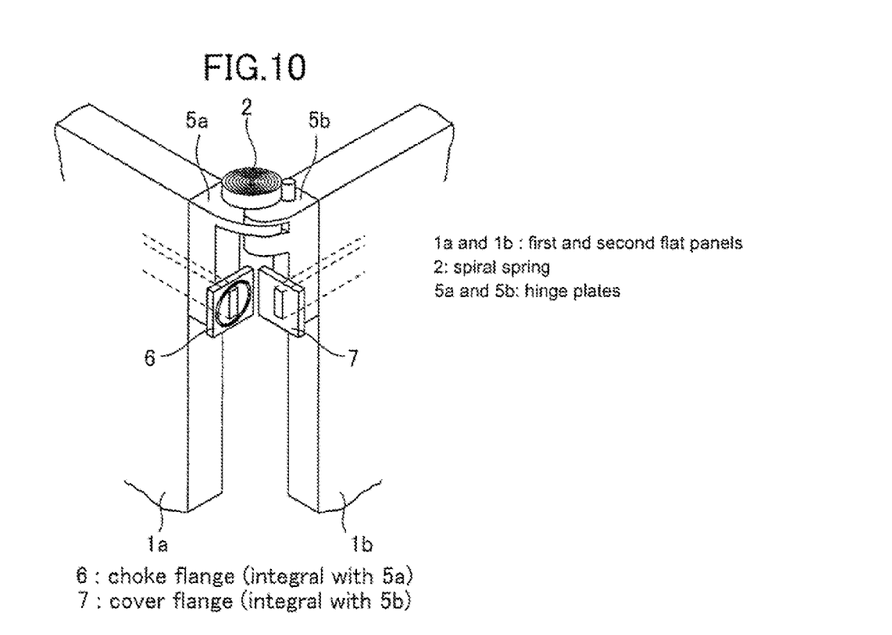
FIG. 10 is a view illustrating an embodiment of the present invention in which a hinge and a waveguide opening in a deployment mechanism are integral with each other.
Figure 11:
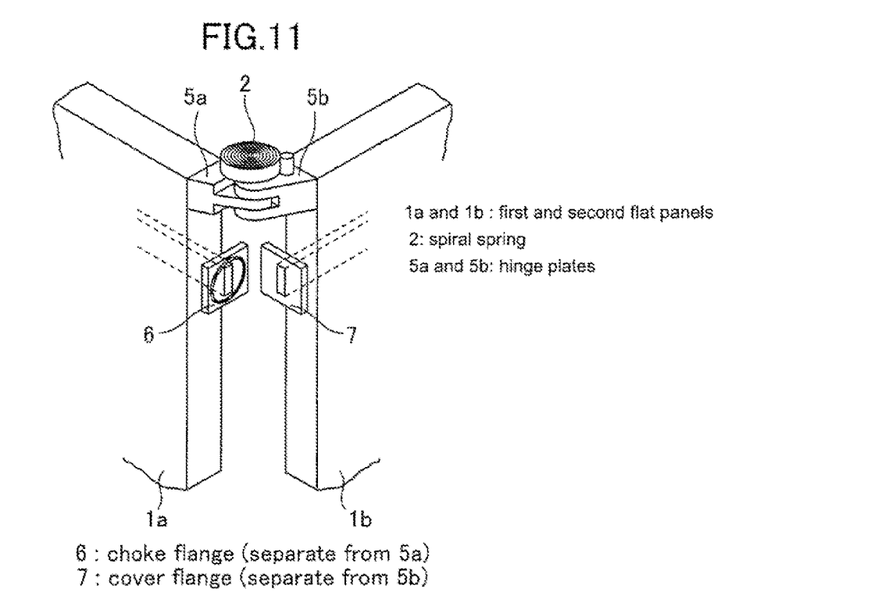
FIG. 11 is a view illustrating an embodiment of the present invention in which the hinge and the waveguide opening are constructed of separate components.

Structures of deployment portions are illustrated in FIGS. 10 and 11. In FIG. 10, a hinge of a deployment mechanism is integral with a waveguide opening. In FIG. 11, the hinge and the waveguide opening are constructed of separate components.

The present invention can solve problems inherent in conventional technologies, involved in feeding high-frequency waves to a deployment structure. Specifically, a flexible waveguide or cable and a rotary joint are not utilized, which thus enables avoiding problems involved in design, fabrication and testing associated with resistance bending torque of the waveguide or cable and the rotary joint. Elimination of the resistance bending torque, in particular, enables lessening an impact of deployment.

Moreover, in the above "Case of Deployment Mechanism with Rough Accuracy," the two waveguides can be arranged facing each other in positions deployed with a rough accuracy of the order of no more than 1/30 of a wavelength (or 1 mm in the X band), and thus, a complicated and highly accurate deployment mechanism is not necessary for a band of microwaves, or long millimeter waves.

Further, the flexible waveguide or cable and a mode converter are not utilized, which thus enables a reduction in high-frequency loss. Moreover, a high-frequency electromagnetic field does not propagate through a sliding or contact portion of the deployment portion, and thus, there is also the advantage of not adding resistance noise.

In the field of space applications, there often arises a need for a large-area antenna to transmit or receive high-frequency waves for satellite communications, radar observation missions, solar-electric power generation, microwave transmission or the like. In such a system, high-frequency loss is important performance for the system.

A hollow waveguide is a least-loss transmission line for microwaves or millimeter waves in the X or higher-frequency bands. Moreover, a waveguide has good compatibility with a Cassegrain antenna or a waveguide slot antenna which is a high-efficiency antenna for microwaves or millimeter waves. Although the waveguides have great advantages as described above, a low-loss rigid waveguide, because of lacking flexibility, has many problems with instrumentation or equipment in routing or a deployment portion or the like, which are involved in implementation on a system.

For such problems, heretofore practiced methods include i) a method using a flexible coaxial cable in place of the waveguide, and ii) a method in which an electronic device such as a frequency converter, a phase shifter, a bulk power amplifier for high-frequency wave transmission or a low-noise amplifier for reception is mounted in immediate proximity to an antenna or on each deployable antenna panel in order to avoid a feeding loss.

In method i), the coaxial cable having substantial flexibility may sufficiently decrease high-frequency loss, and ease of mounting is paramount at the expense of system performance. The method ii) requires that a complicated electronic equipment system be mounted on the deployable antenna or panel in adverse machine, heat or radiation environments, and thus, the system is prone to be heavy and thick and high in cost. It may be said that method ii) is suitable for a system needing electronic radiation beam sweep which requires that a variable phase shifter and a power amplifier be installed in immediate proximity to each antenna element, and for a large-sized deployable antenna which needs to feed at a distance of 10 mm or more.

An example of an applicable field of the present invention is a technology for achieving a low-cost and lightweight deployable antenna having a size of the order of a few meters, which does not need electronic sweep of an electromagnetic wave beam. Several high-efficiency waveguide slot antennas which recently have been developed are deployed, and thereafter, a high-frequency wave transmitting/receiving device mounted on a satellite body uses the technology of the present invention for low-loss waveguide feeding. Thus, a small-sized satellite having a housed area of 1 m or less when mounted on a rocket can be utilized for earth observation/monitoring missions using a microwave synthetic-aperture radar.

Recently, various earth observation/monitoring missions using a small-sized satellite have been realized, and an optical telescope having a numerical aperture of 10 cm is used as observation equipment for almost all the missions. To perform observation or monitoring without being affected by nighttime or weather conditions, it is necessary that a radio wave sensor such as a synthetic-aperture radar (SAR) needing an antenna having a size of a few meters be simply mounted on the small-sized satellite. The present invention enables such mounting.

First Embodiment

Hinge is Integral with Waveguide

An embodiment of the present invention will be described with reference to the drawing. FIG. 10 is a perspective view illustrating a deployment mechanism of a deployable antenna. In FIG. 10, reference numerals 1a and 1b denote parts which are precisely identical to those of a deployment mechanism unit of a conventional deployable antenna. Reference numerals 5a and 5b denote portions of a hinge plate having a hinge portion integral with a waveguide portion, and one waveguide opening has a choke flange 6, and the other surface has a cover flange 7.

Next, operation will be described. An antenna panel is deployed by action of a spiral spring 2 having a deploying force, and the portions of the hinge plate 5a and 5b having the hinge portion integral with the waveguide portion operates so that surface of the choke flange portion 6 and surface of the cover flange 7 of the waveguide opening face each other.

Second Embodiment

Hinge is Separate from Waveguide

Another embodiment of the present invention will be described below with reference to the drawing. FIG. 11 is a perspective view illustrating a second embodiment of the present invention. In FIG. 11, reference numerals 1a, 1b, 2 and 6 denote parts which are precisely identical to those of the deployment mechanism unit of the conventional deployable antenna. Anything may be used as a deployment hinge mechanism, in particular. One of the waveguide opening surfaces separately connected to the antenna panel has the choke flange 6, and the other surface has the cover flange 7.

Next, operation will be described. The antenna panel is deployed by action of the spiral spring 2 having a deploying force, and the portions of the hinge plate 5a and 5b having the hinge portion separate from the waveguide portion operate so that the surface of the choke flange 6 and the surface of the cover flange 7 of the waveguide opening face each other.

Third Embodiment

Changeover to Waveguide is Made at Joint Surface even in Feeding System other than Waveguide In a region other than a joint portion of a deployable panel, even if a feeding system other than the waveguide is used, a changeover to the waveguide is made at a connection portion, and thereafter, the present system which is low in loss and suitable for a deployment portion may be used at the joint portion.

4. Non-Circular Choke Flange

Figure 12:
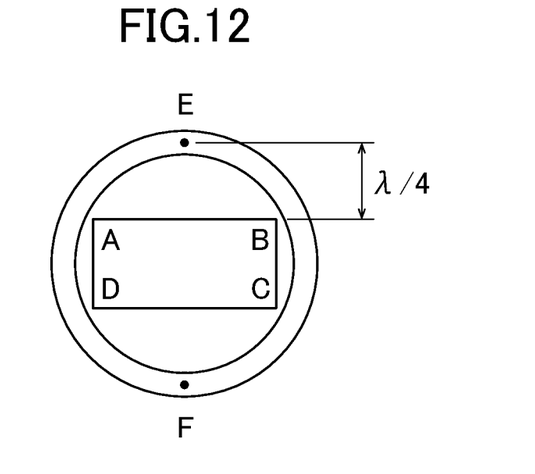
FIG. 12 is a front view of a choke flange having a circular choke groove.

The choke groove of the choke flange previously described is circular in shape as illustrated in FIG. 6(b). In FIG. 12, the shape of the circular choke groove is a circle having the smallest diameter and passing in the vicinity of two points E, F spaced $\lambda/4$ away from middle points of, and perpendicularly outward with respect to, long sides AB and CD of a rectangle ABCD which forms a cross section of a standard rectangular waveguide. (Note that $\lambda$ is a wavelength of an electromagnetic wave used.) The depth of the choke groove is such that the groove has a depth of about $\lambda/4$ (refer to FIG. 6(a)).

A distribution of an electromagnetic field in the waveguide is maximum near a central point of the long side, and in the circular choke groove, the choke groove extends to a position near the central point of the long side and spaced $\lambda/4$ away from the long side, whereas a distance from a short side is shorter than this, but in a typical case, this presents little problem. However, there is a demand for higher characteristics in a hinge portion in a deployment object of space equipment. In a case of the circular choke groove, a great loss occurs actually as illustrated in an elliptic portion surrounded by broken lines in FIG. 9.

Figure 13:
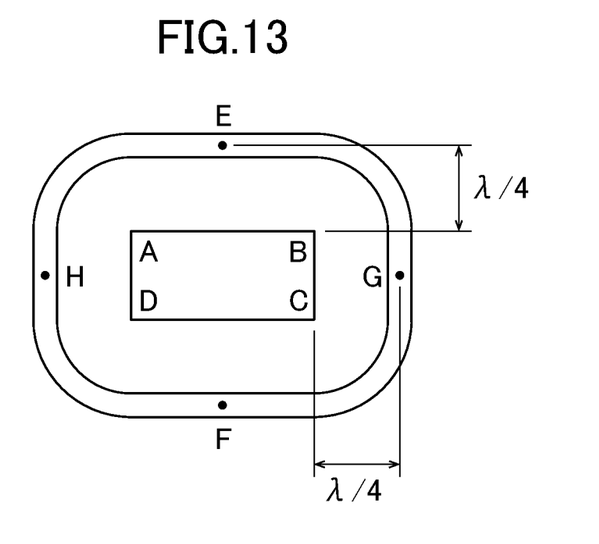
FIG. 13 is a front view of a choke flange having a non-circular choke groove.

The inventors of the present application have found out that when the choke flange is provided with a non-circular choke groove as illustrated in FIG. 13, the non-circular choke groove exhibits characteristics superior to those of the circular choke groove. A shape of the non-circular choke groove is formed of a curved line passing in the vicinity of four points E, F, G, H spaced $\lambda/4$ away from the middle points of, and perpendicularly outward with respect to, the long sides AB and CD and short sides BC and DA of the rectangle ABCD which forms the cross section of the standard rectangular waveguide. Such curved lines include curved lines other than a circle, including elliptical and oval shapes and the like. The depth of the choke groove is such that the groove has a depth of about $\lambda/4$, as is the case with the circular choke groove.

Figure 14:
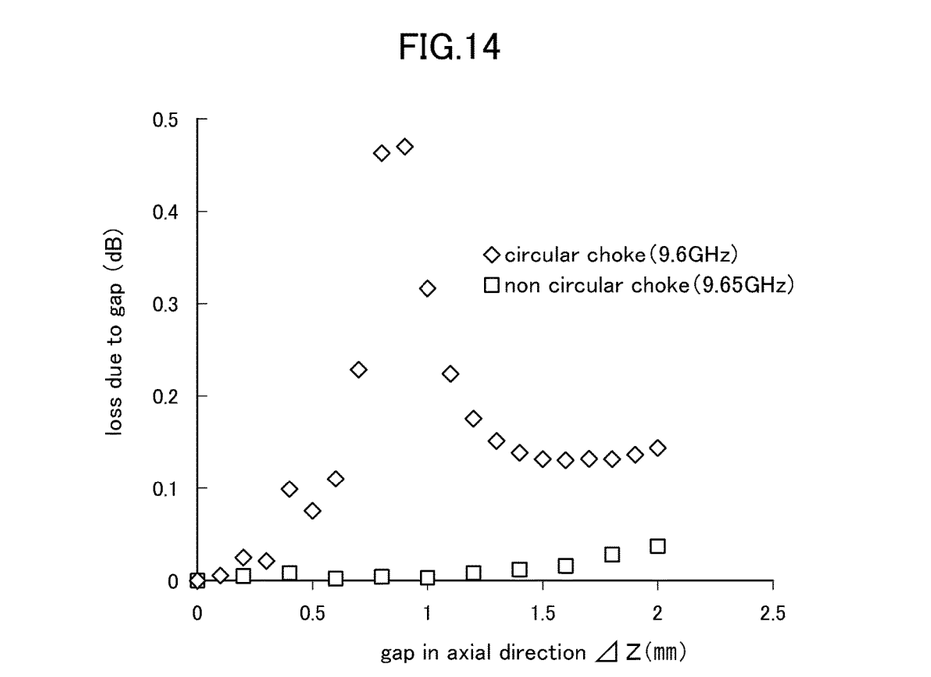
FIG. 14 is a graph illustrating results of experiments for comparison between losses of high-frequency signals in a case where a circular choke flange is used as one flange and in a case where a non-circular choke flange is used as one flange.

FIG. 14 is a graph illustrating results of experiments for comparison between losses of high-frequency signals in a case where a circular choke flange (9.6 GHz), shown by ◇, is used as one flange and in a case where a non-circular choke flange (9.65 GHz), shown by □, is used as one flange. In FIG. 14, in both cases, the choke flange and the cover flange were offset from each other by $\Delta x=1$ mm and $\Delta y=0$ mm, the gap in axial direction $\Delta z$ of the waveguide was changed (horizontal axis, measured in mm), and the loss due to gap (vertical axis, measured in dB). As can be seen from FIG. 14, it is observed that in the circular choke flange, there is an increase in loss in the form of resonance depending on the gap $\Delta z$ in the axial direction and the frequency. In contrast, in the non-circular choke flange, there is little increase in loss in the form of resonance as observed in the circular choke flange.

In the embodiments illustrated in FIGS. 10 and 11, therefore, the non-circular choke flange is used in place of the circular choke flange, thereby enabling a further reduction in a loss of a high-frequency signal.

EXPLANATION OF THE REFERENCE NUMERALS 1a and 1b antenna panels
2 spiral spring
3a and 3b hinge plates
4 flexible waveguide
5a and 5b hinge plates
6 choke flange
7 cover flange
A concave portion for fitting together
B convex portion for fitting together
H hole for fitting together
P pin for fitting together

The invention claimed is:

1. A deployment structure comprising:
   a plurality of flat panels being deployed by rotation around an axis of rotation; and
   a respective waveguide provided to each of the plurality of flat panels for feeding high-frequency waves from one to another of the plurality of flat panels when the plurality of flat panels are deployed,
   wherein the respective waveguide is provided with respect to the corresponding flat panel so that a direction of propagation of the high-frequency waves is parallel to the flat panel and perpendicular to the axis of rotation, and
   wherein a choke flange provided at an end of the respective waveguide that is provided to one of the adjacent flat panels and a cover flange provided at an end of the respective waveguide that is provided to another of the adjacent flat panels are configured to be arranged such that the choke flange and the cover flange face each other and are spaced apart from each other when the plurality of flat panels are deployed.

2. The deployment structure according to claim 1, wherein a shape of a choke groove of the choke flange is formed of a non-circular curved line which passes through points which are located at a length of $\lambda/4$ from sides of a rectangle of cross section of the respective waveguide provided to the one of the adjacent flat panels, the sides having a largest magnitude of an electric field, and
   wherein $\lambda$ is a wavelength.

3. The deployment structure according to claim 1, wherein each of the plurality of flat panels is connected to a movable portion of a hinge and is configured to be deployed by rotational operation of the hinge, and each waveguide is integrally constructed with the movable portion of the hinge.

4. The deployment structure according to claim 1, wherein a choke groove of the choke flange is circular in shape.

5. The deployment structure according to claim 1, wherein a shape of a choke groove of the choke flange is formed of a non-circular curved line.

6. The deployment structure according to claim 3, wherein the deployment structure is a part of a deployable antenna.

7. The deployment structure according to claim 3, wherein a choke groove of the choke flange is circular in shape.

8. The deployment structure according to claim 3, wherein a shape of a choke groove of the choke flange is formed of a non-circular curved line which passes through points which are located at a length of $\lambda/4$ from sides of a rectangle of cross section of the respective waveguide provided to the one of the adjacent flat panels, the sides having a largest magnitude of an electric field, and
   wherein $\lambda$ is a wavelength.

9. The deployment structure according to claim 3, wherein a shape of a choke groove of the choke flange is formed of a non-circular curved line.

10. The deployment structure according to claim 1, wherein the deployment structure is a part of a deployable antenna.

\* \* \* \* \*